(12) United States Patent
White et al.

(10) Patent No.: US 12,527,550 B2
(45) Date of Patent: Jan. 20, 2026

(54) SYSTEM AND METHOD FOR SIMULTANEOUS ACQUISITION OF PULSED-WAVE DOPPLER AND COLOR DOPPLER FOR RETROSPECTIVE ANALYSIS OF CARDIOVASCULAR FUNCTION

(71) Applicant: FUJIFILM SonoSite, Inc., Bothell, WA (US)

(72) Inventors: Christopher White, Vancouver (CA); Stephen Buttars, Toronto (CA); Melissa Yin, Richmond Hill (CA)

(73) Assignee: FUJIFILM SonoSite, Inc., Bothell, WA (US)

( * ) Notice: Subject to any disclaimer, the term of this patent is extended or adjusted under 35 U.S.C. 154(b) by 111 days.

(21) Appl. No.: 18/478,340

(22) Filed: Sep. 29, 2023

(65) Prior Publication Data
US 2025/0107778 A1 Apr. 3, 2025

(51) Int. Cl.
*A61B 8/00* (2006.01)
*A61B 5/352* (2021.01)
*A61B 8/08* (2006.01)

(52) U.S. Cl.
CPC .............. *A61B 8/488* (2013.01); *A61B 5/352* (2021.01); *A61B 8/0883* (2013.01); *A61B 8/461* (2013.01); *A61B 8/5223* (2013.01)

(58) Field of Classification Search
CPC ....... A61B 8/488; A61B 5/352; A61B 8/0883; A61B 8/461; A61B 8/5223; A61B 8/0891; A61B 8/463; A61B 8/5207; A61B 8/06
See application file for complete search history.

(56) References Cited

U.S. PATENT DOCUMENTS

| | | | |
|---|---|---|---|
| 2007/0049824 A1* | 3/2007 | Konofagou | G01S 7/52087 600/437 |
| 2021/0015456 A1* | 1/2021 | Chiang | A61B 8/0883 |

* cited by examiner

*Primary Examiner* — Bo Joseph Peng
(74) *Attorney, Agent, or Firm* — Colby Nipper PLLC

(57) ABSTRACT

Systems and methods for simultaneous acquisition of pulsed-wave Doppler and color Doppler for retrospective analysis of cardiovascular function are disclosed. In aspects, imaging techniques are used for acquisition of raw partly processed ultrasound data. The ultrasound data is stored in its raw form, synchronized with a simultaneously acquired physiological signal. The stored ultrasound data can then be accessed and processed according to pulsed-wave Doppler and color Doppler imaging techniques to provide both a full frame, or sequence of frames of color Doppler images and a post-acquisition pulsed-wave Doppler signal of a sample volume at one or more locations within the acquisition area using the color Doppler image. Such locations can be selected automatically or by a user, and a pulsed-wave spectrum for the selected location is displayed. As the user moves the sample volume around, the pulsed-wave spectral data is recomputed and redisplayed.

20 Claims, 12 Drawing Sheets

400

500

700

800

SYSTEM AND METHOD FOR SIMULTANEOUS ACQUISITION OF PULSED-WAVE DOPPLER AND COLOR DOPPLER FOR RETROSPECTIVE ANALYSIS OF CARDIOVASCULAR FUNCTION

BACKGROUND

Conventional ultrasound techniques include a color Doppler mode, which is generally applied to help select a suitable location to position a single pulsed-wave (PW) Doppler sample volume for subsequent imaging using a PW Doppler mode. Color Doppler images typically represent, for an entire image acquisition area, the average or maximum velocity of the underlying tissue. Often, filtering is used to remove slow-moving tissue to isolate only blood flow. The PW sample volume is a small region within the acquisition area where a PW signal is acquired. This PW signal is typically displayed visually as a frequency spectrum of the signal along with an audio component. The sample volume defines a horizontal and vertical position over which the signal is acquired. The size of the sample volume indicates how much PW signal is acquired and integrated; typically a higher number of transmit cycles (Tx) and integrated receive (Rx) samples are used for a larger size sample volume.

In some cases, if the pulse repetition frequency (PRF) is sufficiently low (e.g., one kilohertz (kHz)), a low-resolution color Doppler image can be acquired using pulse interleaving techniques simultaneously with PW Doppler imaging. However, methods for acquisition and display of a "scout" image have problems. The temporal resolution of color Doppler itself is relatively low, which makes it difficult to acquire a suitable color Doppler overlay for fast-moving blood. Consider, for example, a mouse heart beating at 600 beats per minute (bpm); a color Doppler acquisition occurring at 10 to 20 frames per second (fps) has a temporal resolution that results in an image that appears as random, disconnected snapshots of the heart motion. If attempts are made to acquire PW and color Doppler simultaneously, then the frame rate drops even further. The utility of these color Doppler images for selecting suitable points to place a PW spectrum is therefore low.

Additionally, PW Doppler only acquires data at a single PW position at a time. In some limited cases it may be possible to acquire two PW positions at a time but only by using a low PRF where there is sufficient time to allow switching between the two sample volumes. A high PRF is required when imaging fast-moving blood as the PRF is related to the maximum detectable velocity. Acquiring more than one sample volume provides benefits for applications such as pulse-wave velocity measurements. However, if the user does not select the correct positions during acquisition, the user is required to perform a new acquisition, resulting in a poor user experience.

SUMMARY

Systems and methods for simultaneous acquisition of PW Doppler and color Doppler for retrospective analysis of cardiovascular function are disclosed. In aspects, imaging techniques are used for acquisition of raw partly processed ultrasound data, which can be retrospectively processed to show a color Doppler image as well as a PW Doppler spectrum for any location in the target acquisition area. The ultrasound data is stored in its raw form and optionally synchronized with a simultaneously acquired physiological signal (e.g., echocardiogram, or ECG signal). The stored ultrasound data can then be accessed and processed according to PW Doppler and color Doppler imaging techniques to provide both a full frame, or sequence of frames of color Doppler images and a post-acquisition PW Doppler signal of a sample volume at one or more locations within the acquisition area using the color Doppler image as a guide. Such locations can be selected automatically or by a user, and a PW spectrum for the selected location is displayed. As the user selects new or additional sample volume positions, the PW spectral data is recomputed and redisplayed.

In some aspects, a method is disclosed. The method includes generating a color Doppler image for display via a display device. In aspects, the color Doppler image is generated based on ultrasound data corresponding to echoes of ultrasound signals transmitted by an ultrasound scanner at an anatomy of a subject. The ultrasound data can be synchronized with a simultaneously acquired physiological signal acquired from the subject during acquisition of the echoes. Also, the ultrasound data is stored in a memory. In addition, the method includes receiving a first user input that selects a first virtual sample volume corresponding to a first location on the color Doppler image. The method also includes accessing the memory to locate a portion of the ultrasound data that corresponds to the first virtual sample volume. Further, the method includes generating a first pulsed-wave spectrum for the portion of the ultrasound data corresponding to the first virtual sample volume. Also, the method includes determining one or more metrics associated with the first pulsed-wave spectrum for display.

In some aspects, an ultrasound system is disclosed. The ultrasound system includes an ultrasound scanner configured to generate ultrasound data for color Doppler imaging based on echoes of ultrasound signals transmitted by the ultrasound scanner into a subject at one or more anatomical targets of interest. The ultrasound system also includes one or more processors and one or more computer-readable storage media having instructions stored thereon that, responsive to execution by the one or more processors, cause the one or more processors to synchronize the ultrasound data with a physiological signal acquired from the subject during acquisition of the echoes. The one or more processors are also configured to store the ultrasound data for color Doppler imaging in a memory. In addition, the one or more processors are configured to generate a color Doppler image for display via a display device of the ultrasound system. The color Doppler image is generated based on the ultrasound data generated by the ultrasound scanner. Also, the one or more processors are configured to, in response to a first user input that selects a first virtual sample volume corresponding to a first location on the color Doppler image, access the memory to locate a portion of the ultrasound data that corresponds to the first virtual sample volume. Further, the one or more processors are configured to generate a first pulsed-wave spectrum for the portion of the ultrasound data corresponding to the first virtual sample volume. The one or more processors are also configured to determine one or more metrics associated with the first pulsed-wave spectrum for display via the display device.

BRIEF DESCRIPTION OF THE DRAWINGS

The appended drawings illustrate examples and are, therefore, exemplary embodiments and not considered to be limiting in scope. Throughout the drawings, the same numbers are used to reference like features and components.

DETAILED DESCRIPTION

Figure 1:
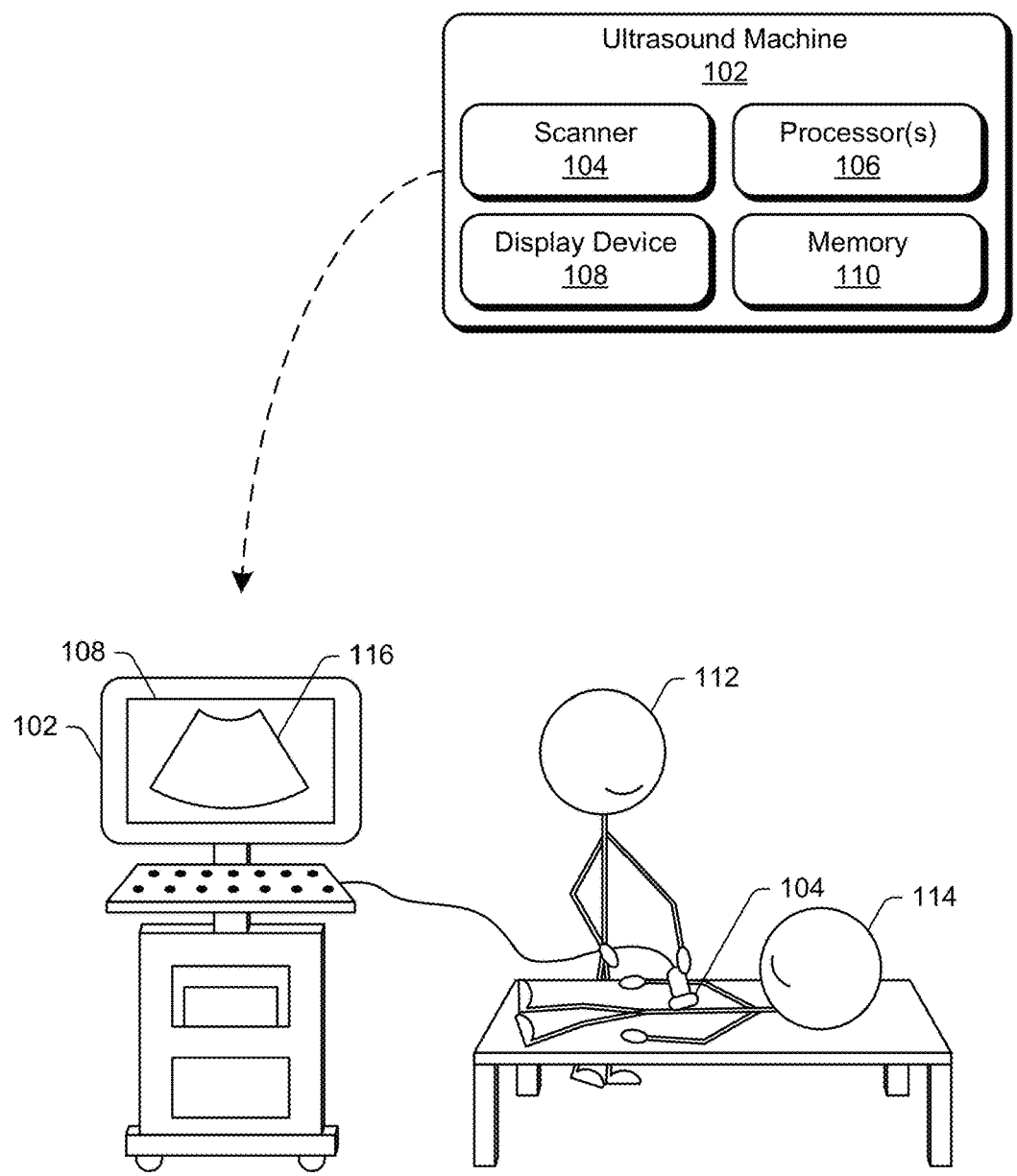
FIG. 1 illustrates an example environment for an ultrasound system having an ultrasound scanner, in accordance with one or more implementations.

Disclosed herein is a system for simultaneous acquisition of PW Doppler and color Doppler for retrospective analysis of cardiovascular function. A frame is the accumulation of data acquisition lines usable to generate an ultrasound image. A data acquisition line corresponds to a vertical line on an image (the ultrasound image) consisting of a transmit-receive pulse pair, or in some cases a single transmit and multiple receive lines. The frame rate is the number of frames per second (fps) and is generally measured in hertz (Hz), kilohertz (kHz), or megahertz (MHz). Data acquisition lines are acquired based on pulses (or echoes) emitted by a transducer (e.g., scanner) of an ultrasound machine. Each echo consists of samples taken at, for example, 15, 50, 60, or more Mhz. The samples are in a depth direction starting at the transducer array. For example, each echo might consist of 4000 to 8000 or more samples. In some embodiments, decimation can be used to reduce the actual number of samples acquired. The pulse repetition frequency (PRF) is the number of pulses emitted per second by the transducer. The pulses are spaced to provide sufficient time between pulses for the transmit beam to reach the target and reflect back to the transducer before the next pulse is generated.

To acquire data suitable for generation of both color Doppler images and PW Doppler spectra, a large stream of data (e.g., a continuous collection of sequential echoes (also referred to as pulses) at a fixed PRF) is acquired at each line of the resulting image. The terms "line" and "echo" are often used interchangeably; however, line is usually associated with a position in the image. Each line of the resulting image corresponds to transmit-receive pairs focused at horizontal positions along an array of an ultrasound transducer, or in some aspects, a single fixed physical position of a single element transducer. In some aspects, a single transmit pulse may result in 2 or more received lines (multiline acquisition). For example, 2, 4, 6 or 8 lines or more may be produced for each transmit pulse. In some aspects, the transducer might be a linear transducer and the transmit/receive lines are focused at positions along the transducer array. In other aspects, the transducer may be curved, for example as a phased array, and the transmit/receive lines may be focused at non-parallel positions through a target area. For example, a target area may be imaged by focusing a set of lines, for example, 16, 64, 128, 256, or more throughout the area. Typically, the lines are uniformly distributed and may be parallel in the case of linear arrays. How they are focused depends on the array configuration, as would be clear to one skilled in the art.

A single image can be formed by collecting, for example, 256 lines distributed through the target area. The single image may also be formed by collecting multiple lines at each distributed line in the target area. For example, if the image includes 256 lines, then one second(s) of data can be acquired at a PRF of 5 kHz, 10 kHz, 20 kHz, 50 kHz, etc. at each of the lines. The actual acquisition time per line can vary, such as for example, 1/10 second or less, 1/2 second, 2 seconds or more. A number of different retrospective post-processing techniques can be used to generate usable, displayable data from this collection of data. In one aspect, color Doppler data can be processed using the data sequence at each line. In another aspect, using retrospective processing methods combined with synchronization to a physiological signal, such as an echocardiograph (ECG) signal, a high-frame rate B-Mode or color Doppler image sequence can be generated at, for example, 1000 fps, throughout a cyclical cardiac cycle. In one representative example, acquisition starts at line 0 (or position 0), acquires 1 second of data at 1 KHz resulting in 1000 echoes at that position. The acquisition then moves to line 1 (or position 1) and repeats the process until the full data set of 256×1000 lines is acquired in approximately 256 seconds.

In some embodiments, a technique called multiline can be utilized. This enables the acquisition and generation of multiple adjacent data lines from a single transmit pulse. For example, 2, 3, 4, or more lines can be generated at the same time. In one representative example, if the multiline value is 2, then line 0 and line 1 are acquired at the same time, resulting in a 2× reduction in the total acquisition time.

In another embodiment, the acquisition time can be optimized further by interleaving additional lines between the period gap of the PRF (e.g., a PRF of 1000 Hz would enable one millisecond (ms) for additional lines to be acquired). For example, for a PRF of 1 kHz, each echo for each line (or position) is acquired at exactly 1 millisecond intervals. Since the echo time (e.g., a time for the ultrasound wave to reach the target and return back to the transducer array) is usually much less than one millisecond, after the first echo is acquired, there is a period of time available for additional lines to be acquired before the next PRF interval is due. In one representative example, the echo time is 200 microseconds, enabling acquisition of 5 echoes each millisecond. The acquisition sequence would then look as follows: lines 0, 1, 2, 3, 4, 0, 1, 2, 3, 4, etc. If the PRF is 1 kHz and 1 second of data is acquired, then this sequence of 5 lines would be repeated 1000 times. This technique can also be combined with multiline.

Regardless of the acquisition methods utilized (e.g., multiline, interleaving, or both), the final data set may include a sequence of echoes of variable duration at variable PRF for each line position in the image. The acquisition order may be different in each case; however, this data can be reordered post-acquisition or even in real-time to generate a similar data set. During acquisition, each acquired echo is tagged with the exact time of acquisition. This tag enables the acquired echoes to be synchronized with a simultaneously acquired physiological signal, which is also tagged with time stamps. These time stamps enable optional synchronization of the acquired echoes with events in the physiological signal (e.g., the R-Wave of an ECG signal). As one skilled in the art can appreciate, one could also acquire other signal types (e.g., temperature or other monitoring data) at the same time and synchronize the acquired echoes with such other signals.

In one implementation, a single static color Doppler image can be generated using the acquired data as described. Using a small set of data (e.g., 8 or less, 16, 32 or more echoes) at each line position, color Doppler processing techniques are used to produce a single color Doppler line, typically representing the maximum velocity for each sample of each line. Collecting these lines together enables a full frame color Doppler image to be produced. This implementation is well suited to anatomy not affected strongly by cardiac motion, such as tumors, liver, kidney, etc.

In another implementation, a sequence of high-frame-rate color Doppler images can be generated using the acquired data as described. Using the R-Wave from a synchronized physiological signal as a timing event, a full sequence of a heart cycle at frame rates of, e.g., 100 Hz, 500 Hz, 1000 Hz, or more, can be reconstructed. This reconstruction method is called color Electrocardiogram-gated Kilohertz Visualization (EKV™) (also referred to herein as EKV color Doppler or color EKV). Other synchronization points in the physiological signal can also be used; for example, a respiration signal can be used to help isolate regions affected by breathing artifacts. This EKV implementation is well suited to cardiac anatomy such as large arteries and the heart.

In one implementation, the generated high-frame rate EKV color Doppler image sequence can be generated and used to position a PW sample volume for subsequent acquisition of a PW signal. In another implementation, the static single generated color Doppler image can be used to position a PW sample volume for subsequent acquisition of a PW signal. While both implementations are useful in helping to determine where to place a PW sample volume, such implementations represent historical representations and the actual anatomy may shift.

In another implementation, the acquired signal(s) at each line can be used for post-acquisition display of a PW Doppler signal. Essentially, the acquired data, as described herein, provides PW Doppler data already at each line in the image for all samples. For example, a PW Doppler spectra can be generated from a single sample of data collected at a fixed PRF over a duration of time (e.g., 1 kHz for 1 second). Using a Fast Fourier Transform (FFT), Discrete Fourier Transform (DFT), or other transforms (e.g., wavelet), the frequency spectra of this sample can be generated. This is the fundamental basis for PW Doppler imaging. As explained previously, data acquired using the techniques described herein includes exactly the data required to produce PW spectra as well as color Doppler images. For each sample or each line of the image, a duration of data from 100 ms or less to 1 second or more at a fixed PRF has already been acquired.

Using either the static generated color Doppler image, or the EKV color Doppler image sequence, one or more PW sample volumes can be selected. The user may, in a review situation, place a virtual PW sample volume over an area of "interesting" flow on the displayed image and instantly (or nearly instantly) be presented with a PW spectral image corresponding to that location. The size of the gate represents the number of samples that are integrated to produce the PW signal. Because the ECG signal is also acquired and synchronized with the acquisition, the ECG signal can be displayed along with the PW signal. As the user moves the virtual PW sample volume around on the display, the spectral signal is recomputed in real-time and redisplayed.

Using the techniques described herein enhances the user experience by, for example, generating additional information without requiring additional PW Doppler acquisitions. Further, the system can provide spectral signals for any PW volume selected by the user in the displayed ultrasound image. Accordingly, the acquired color EKV data can be used retrospectively to provide the PW spectral signal without requiring the user to perform new PW Doppler scans.

Example Ultrasound System

FIG. 1 illustrates an example environment for an ultrasound system 100 having an ultrasound scanner, in accordance with one or more implementations. Generally, the ultrasound system 100 includes an ultrasound machine 102, which generates data based on high-frequency sound waves reflecting off body structures. The ultrasound machine 102 includes various components, some of which include a scanner 104, one or more processors 106, a display device 108, and a memory 110.

A user 112 (e.g., nurse, ultrasound technician, clinician, operator, sonographer, etc.) directs the scanner 104 toward a patient 114 to non-invasively scan internal bodily structures (e.g., anatomies, organs, tissues, etc.) of the patient 114 for testing, diagnostic, or therapeutic reasons. In some implementations, the scanner 104 includes an ultrasound transducer array and electronics communicatively coupled to the ultrasound transducer array to transmit ultrasound signals to the patient's anatomy and receive ultrasound signals reflected from the patient's anatomy. In some implementations, the scanner 104 is an ultrasound scanner, which can also be referred to as an ultrasound probe.

The display device 108 is coupled to the processor 106, which processes the reflected ultrasound signals to generate ultrasound data. The display device 108 is configured to generate and display an ultrasound image (e.g., ultrasound image 116) of the anatomy based on the ultrasound data generated by the processor 106 from the reflected ultrasound signals detected by the scanner 104. In some aspects, the ultrasound data includes the ultrasound image 116 or data representing the ultrasound image 116.

Figure 2:
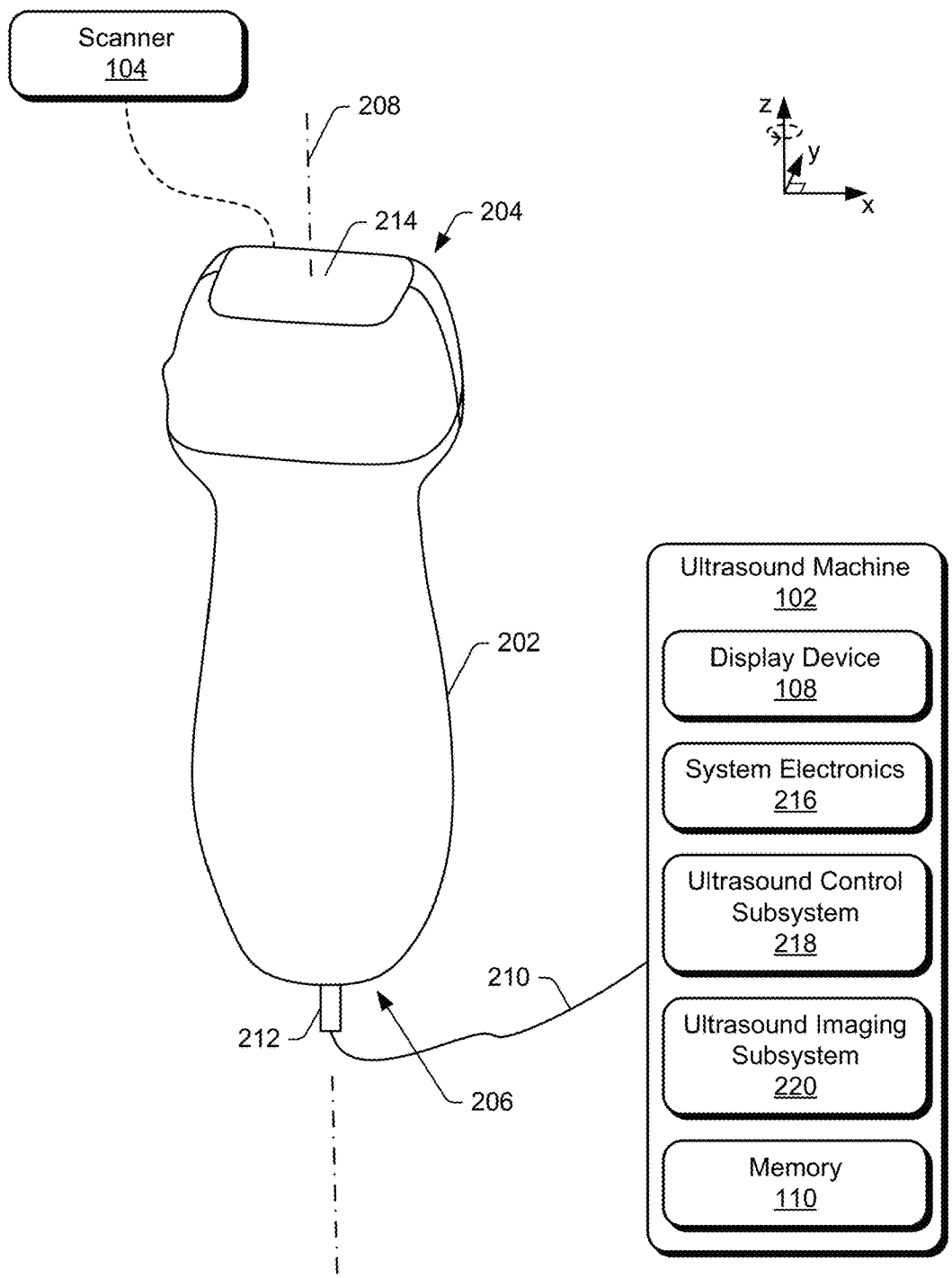
FIG. 2 illustrates an example implementation of the system from FIG. 1.

FIG. 2 illustrates an example implementation 200 of the ultrasound system 100 from FIG. 1. The scanner 104 (e.g., ultrasound scanner) includes an enclosure 202 extending between a distal end portion 204 and a proximal end portion 206. The enclosure 202 includes a central axis 208 (e.g., longitudinal axis) that intersects the distal end portion 204 and the proximal end portion 206. The central axis 208 corresponds to an axial direction of the scanner 104. In an example, the scanner 104 is electrically coupled to an ultrasound imaging system (e.g., the ultrasound machine 102) via a cable 210 that is attached to the proximal end portion 206 of the scanner 104 by a strain-relief element 212. In some implementations, the scanner 104 is wirelessly coupled to the ultrasound imaging system and communicates with the ultrasound imaging system via one or more wireless transmitters, receivers, or transceivers over a wireless connection or network (e.g., Bluetooth™, Wi-Fi™, etc.).

A transducer assembly 214 having one or more transducer elements is electrically coupled to system electronics 216 in the ultrasound machine 102. In operation, the transducer assembly 214 transmits ultrasound energy from the one or more transducer elements toward a subject and receives ultrasound echoes from the subject. The ultrasound echoes are converted into electrical signals by the transducer element(s) and electrically transmitted to the system electronics 216 in the ultrasound machine 102 for processing and generation of one or more ultrasound images.

Capturing ultrasound data from a subject using a transducer assembly (e.g., the transducer assembly 214) generally includes generating ultrasound signals, transmitting ultrasound signals into the subject, and receiving ultrasound signals reflected by the subject. A wide range of frequencies of ultrasound can be used to capture ultrasound data, such as, for example, low-frequency ultrasound (e.g., less than 15 MHZ) and/or high-frequency ultrasound (e.g., greater than or equal to 15 MHZ). A particular frequency range to use can readily be determined based on various factors, including, for example, depth of imaging, desired resolution, and so forth.

In some implementations, the system electronics 216 include one or more processors (e.g., the processor(s) 106 from FIG. 1), integrated circuits, application-specific integrated circuits (ASICs), Field Programmable Gate Arrays (FPGAs), Graphics Processing Units (GPUs) and power sources to support functioning of the ultrasound machine 102. In some implementations, the ultrasound machine 102 also includes an ultrasound control subsystem 218 having one or more processors. At least one processor, FPGA, ASIC, or GPU causes electrical signals to be transmitted to the transducer(s) of the scanner 104 to emit sound waves and also receives electrical pulses from the scanner 104 that were created from the returning echoes. One or more processors, FPGAs, ASICs, or GPUs process the raw data associated with the received electrical pulses and form an image that is sent to an ultrasound imaging subsystem 220, which causes the image (e.g., the image 116 in FIG. 1) to be displayed via the display device 108. Thus, the display device 108 displays ultrasound images from the ultrasound data processed by the processor(s) of the ultrasound control subsystem 218.

In some implementations, the ultrasound machine 102 also includes one or more user input devices (e.g., a keyboard, a cursor control device, a microphone, a camera, etc.) that input data and enable taking measurements from the display device 108 of the ultrasound machine 102. The ultrasound machine 102 can also include a disk storage device (e.g., computer-readable storage media such as read-only memory (ROM), a Flash memory, a dynamic random-access memory (DRAM), a NOR memory, a static random-access memory (SRAM), a NAND memory, and so on) for storing the acquired ultrasound data. In aspects, the disk storage device includes the memory 110, which is local to the ultrasound machine 102. Alternatively, the memory 110 used for storing the acquisition data can be remote, such as on a remote server communicatively connected to the ultrasound machine 102. In addition, the ultrasound machine 102 can include a printer that prints the image from the displayed data. To avoid obscuring the techniques described herein, such user input devices, disk storage device, and printer are not shown in FIG. 2.

EKV Imaging

EKV is an acquisition method that uses thousands of line acquisitions per image position. EKV generates extremely high frame rate images (e.g., 100 or less, 500, or 1000 fps and higher) as a post processing operation using electrocardiograph (ECG) signals used as timing events. EKV imaging may be implemented with either a single element mechanically scanned transducer, or with a transducer array. EKV imaging involves the acquisition of ultrasound lines at a PRF of 1000 Hertz (Hz) or higher at each line position in the 2D image over a time period. The time period over which ultrasound lines are acquired at each line position, referred to as the EKV Time Period, can be for example, 1 s, which is sufficient to capture several cardiac cycles in a mouse or other small animal. The acquisition of each ultrasound line involves the firing of a single transmit pulse followed by acquisition of the returning echo. For example, if there are 250 lines in the 2D image, using a PRF of 1000 Hz and a line time of 1 second, a total of 250,000 ultrasound lines are acquired in the EKV data set. Each frame of the EKV image is reconstructed by assembling the ultrasound lines that were acquired at the same "time" during the cardiac cycle as synchronized by the R-Wave of the ECG or other timing event.

Synchronization with an R-Wave of the ECG enables reconstruction of anatomy governed by the cardiac cycle, for example, heart and arteries. Using the time offset from the R-Wave, data can be selected at specific time points in the heart cycle. Combining data from multiple separate heart cycles enables a high-frame-rate color Doppler image sequence (e.g., EKV) to be generated. In another aspect, the anatomy may not be governed strongly by the cardiac cycle (e.g., tumors, liver, kidney) and, therefore, synchronization with the R-Wave may not be necessary and a single static color Doppler image can be produced.

In one implementation, the acquisition sequence of the EKV data set may be such that the ultrasound line position remains static while the ultrasound lines are acquired over the time period. For example, if the time period is 1 second, and the PRF is 1.0 kHz, then 1000 ultrasound lines are acquired at the first ultrasound line position. The line position can then be incremented, and the process repeated. In this way, all EKV data for all 250 lines in the 2D image is acquired sequentially. The disadvantage of this method of sequencing is that the length of time required to complete the full EKV data set can be relatively long. In this example the time would be 250×1 second=250 seconds.

Figure 3:
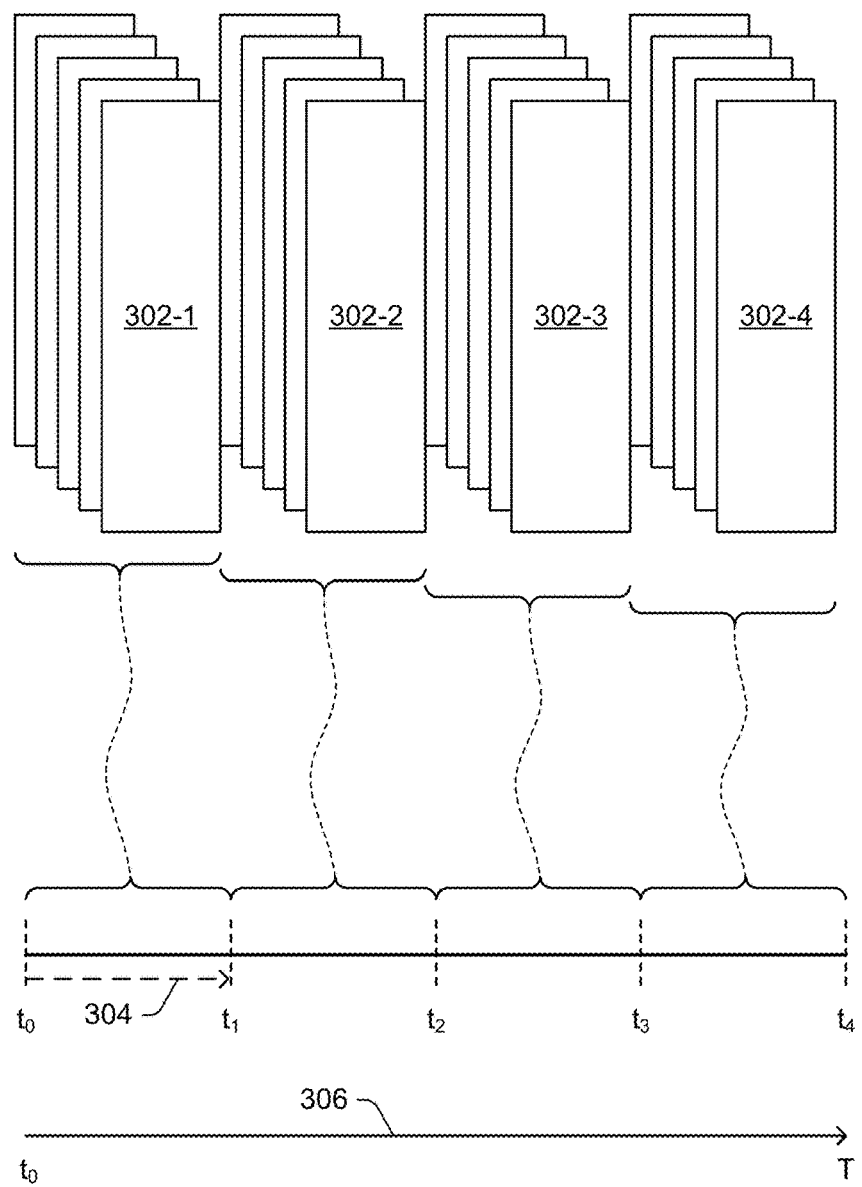
FIG. 3 illustrates an example of ultrasound data acquisition in accordance with implementations disclosed herein.

Consider FIG. 3, which illustrates an example 300 of ultrasound data acquisition in accordance with implementations disclosed herein. In the illustrated example, a plurality of blocks are arranged in groups according to their respective ultrasound line position. Each block (e.g., block 302) represents an ultrasound line corresponding to a vertical line of the resulting ultrasound image. Each block is acquired based on a transmit pulse and corresponding echo. Each ultrasound line position is acquired for a desired acquisition time 304 (referred to as "line-time") (e.g., 1 second, 2 seconds, 5 seconds, 10 seconds, etc.), resulting in a plurality of blocks having the same ultrasound line position but at different times. After data is acquired for one ultrasound line position over the line-time, acquisition of data at a next ultrasound line position begins. Each group, or set, of blocks (e.g., blocks 302-1, 302-2, 302-3, 302-4) can represent any number of ultrasound lines acquired at a respective ultrasound line position. For instance, continuing with the previous example, a first set of blocks 302-1 can represent 1000 ultrasound lines at the first ultrasound line position.

For example, ultrasound data at a first ultrasound line position is acquired repeatedly over a duration of time (e.g., 1 second) from time to $t_0$ time $t_1$ to provide the first set of blocks (e.g., blocks 302-1), where each block 302-1 represents an ultrasound line at the first ultrasound line position but at a unique time between time $t_0$ and time $t_1$. After acquisition of the ultrasound data at the first ultrasound line position over the line-time is complete (at time $t_1$), acquisition of ultrasound data at a second ultrasound line position adjacent to the first ultrasound line position begins and continues repeatedly until time $t_2$ to provide a second set of blocks (e.g., blocks 302-2), where each block represents an ultrasound line at the second ultrasound line position but at a unique time between $t_1$ and $t_2$. Then, acquisition of ultrasound data at a third ultrasound line position adjacent to the second ultrasound line position begins and continues repeatedly until time $t_3$ to provide a third set of blocks (e.g., blocks 302-3), where each block represents an ultrasound line at the third ultrasound line position but at a unique time between $t_2$ and $t_3$. Finally, in this example, at time $t_3$, acquisition of ultrasound data at a fourth ultrasound line position adjacent to the third ultrasound line position begins and continues repeatedly until time $t_4$ to provide a fourth set of blocks (e.g., blocks 302-4), where each block represents an ultrasound line at the fourth ultrasound line position but at a unique time between $t_3$ and $t_4$. In some instances, a time delay can exist between acquisitions of ultrasound data at adjacent ultrasound line positions. In some implementations, the blocks 302 can be acquired in any order. A total acquisition time T 306 is equal to the sum of the line-times of all the acquisition times 304.

Figure 4:
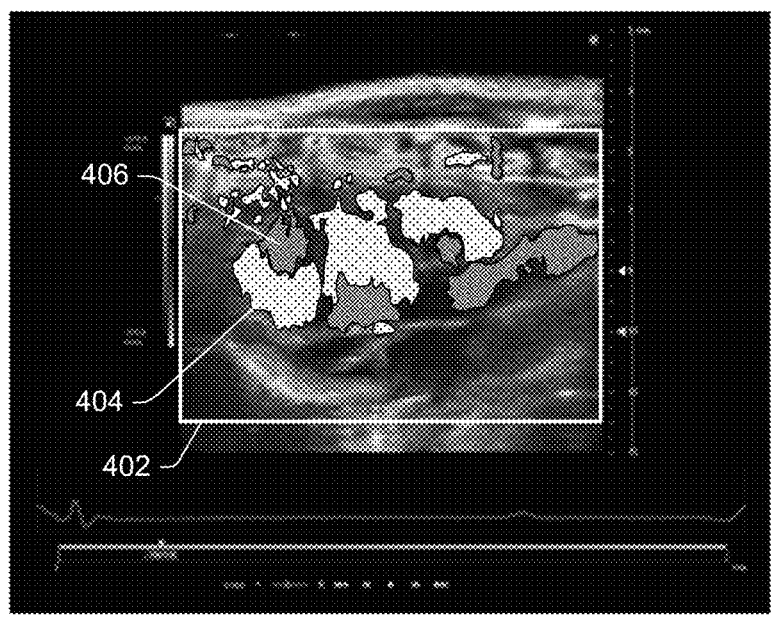
FIG. 4 illustrates an example color Doppler image.

FIG. 4 illustrates an example color Doppler image 400. The example color Doppler image (e.g., EKV image) is illustrated with dotted areas representing different colors. The different colors (or dot-densities) represent blood flow in different directions. Within box 402, EKV data (color Doppler data) is acquired for each vertical line in the image 400. Areas 404 are overlaid with a first color by the ultrasound system to represent blood flow in a first direction and areas 406 are overlaid with a second, different color to represent blood flow in a second, opposite direction compared to the first direction. For EKV imaging, a substantial amount of data is collected for each vertical line in the image 400 (e.g., 1 second of data, 2 seconds of data, etc.). The collected data is processed to generate the color Doppler image 400. The data collected is EKV data (e.g., raw EKV data), which can include uncompressed, demodulated, complex quadrature (IQ) data and is stored in memory. Color Doppler (color EKV) and PW Doppler can both use IQ data to produce a spectrum of the data. For example, color Doppler uses a small ensemble, perhaps 4-32 echoes, and is mostly concerned with peak velocity and direction, which is represented in the resulting ultrasound image by different colors representing fluid flow in different directions (e.g., areas 404 and 406). PW Doppler, however, is mostly concerned with one specific point in the spectra, an example of which is described with respect to FIG. 5. Because the acquired EKV raw data is IQ data, the EKV raw data contains PW data for every sample in the box 402.

Figure 5:
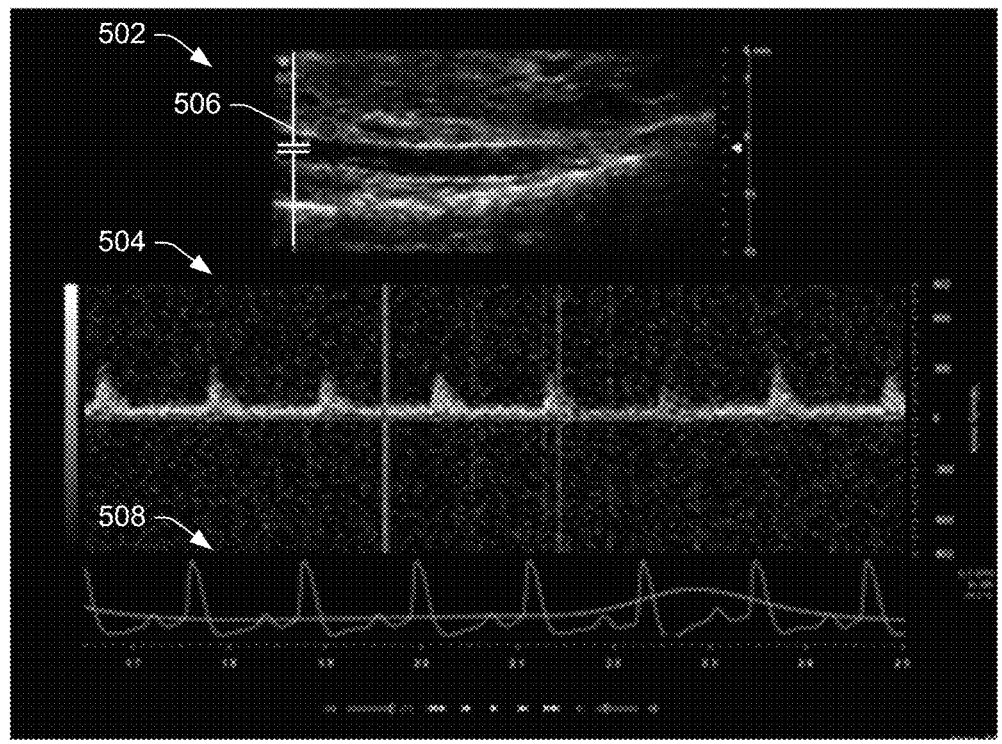
FIG. 5 illustrates an example display of an ultrasound image along with a corresponding PW spectrum.

FIG. 5 illustrates an example display 500 of an ultrasound image 502 along with a corresponding PW Doppler spectrum 504 (PW spectrum 504). The PW spectrum 504 is computed from ultrasound data acquired at a specific point corresponding to the crosshair 506 shown in the ultrasound image 502. To visually correlate the displayed information, the PW spectrum 504 is horizontally aligned with the time scale 508.

In one example, each echo acquired can be associated with a timestamp. In single-line acquisition, no two lines are acquired at exactly the same time. However, multi-line acquisition can acquire two or more lines at the same time and therefore those two or more lines can have the same timestamp. Within the time frame of the total acquisition for the image, each line can be associated with a region of the total acquisition, based on the line's corresponding timestamp. Accordingly, the timestamps can help arrange the acquisition lines in a correct sequential order (e.g., for generating a final complete image), particularly when acquiring repeatedly a small portion of the total acquisition (and while scanning moving elements). In another example, the time scale 508 can be an ECG trace such that the ultrasound system synchronizes (e.g., time aligns, frequency locks, etc.) individual acquisition lines with the ECG trace. By synchronizing the lines with the ECG trace (e.g., R-wave), a heart cycle can be reconstructed. For example, each line or echo has an absolute time stamp, which can also be represented as a time offset from the nearest preceding R-Wave. For example, the heart cycle period may be 100 ms. If, in this example, an echo occurs at 25 ms past the previous R-Wave, then it is also at the ¼ point through the heart cycle. Because the heart cycle is periodic, the image can be reconstructed by inserting each acquisition line into its appropriate position relative to the R-Wave.

Some systems can also periodically acquire scout images, which are images of the entire field of view (FOV) acquired regularly and which serve as displayable real-time updates on the condition of the subject. Such scout images are not necessary to enable the techniques disclosed herein but can be included periodically by inserting them into a frame sequence (ping sequence) of the acquisition.

Figure 6:
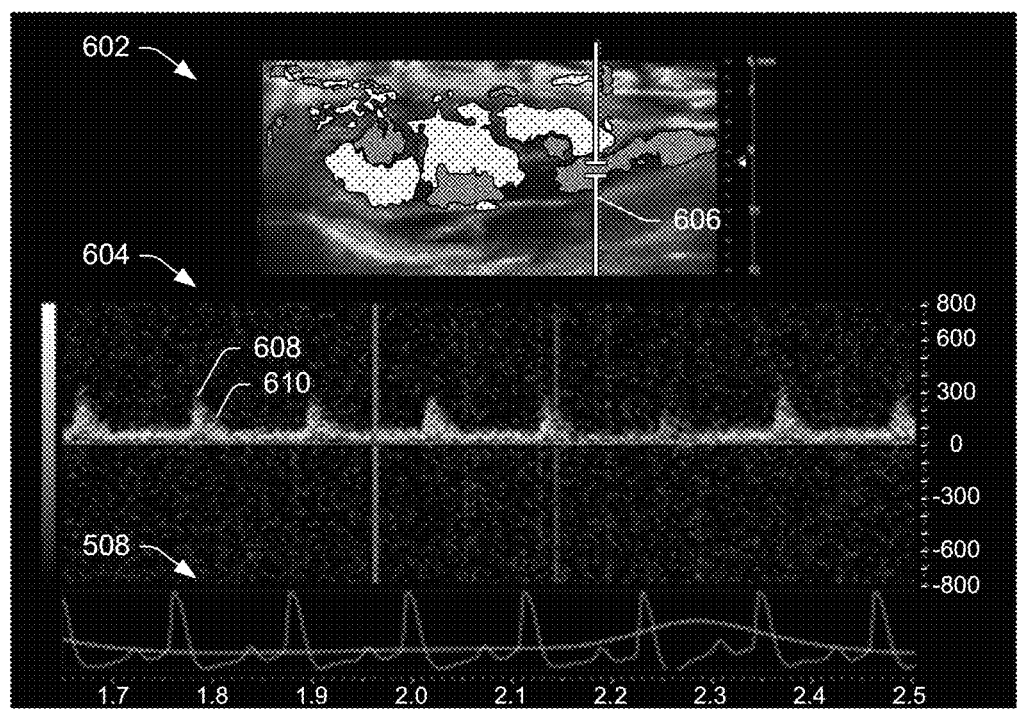
FIG. 6 illustrates an example implementation of a display of a color Doppler image along with a PW spectrum and a time scale.

FIG. 6 illustrates an example implementation 600 of a display of a color Doppler image 602 along with a PW spectrum 604 and a time scale (e.g., the time scale 508). Here, the color Doppler image 602 is displayed and then a user provides user input that selects a location for a virtual sample volume, such as by moving a cursor to a particular location on the color Doppler image 602 and clicking a mouse button. A visual indicator, such as an on-screen marker (e.g., crosshair 606), can be displayed to indicate the selected location of the virtual sample volume. Based on the user selection, the system accesses the stored EKV data to locate the portion of the data corresponding to the selected location and processes the data at that point in a PW Doppler pipeline to provide the PW spectrum 604 corresponding to the selected sample volume. Because the data used for the PW spectrum 604 is already available (e.g., the stored EKV data), the PW spectrum 604 and/or other metrics can be provided in real-time (or near real-time, e.g., within seconds) and without requiring any additional scans by the ultrasound scanner.

Some example metrics include peak velocity, time between intervals, speed at which the flow decreases or increases, etc. For instance, the user may place the cursor at location 608 to cause the system to provide the peak velocity at that point. The user may select location 610 and the system, in response, can provide the rate of decrease for the blood flow at that point. The system can also provide the time between intervals corresponding to the selected point (e.g., location 608 or location 610). If the user selects a new virtual sample volume in the color Doppler image 602 (e.g., user input selects a new location), then the crosshair 606 moves to the newly selected location and the system, in response, generates and displays a new corresponding PW spectrum and time scale.

Figure 7:
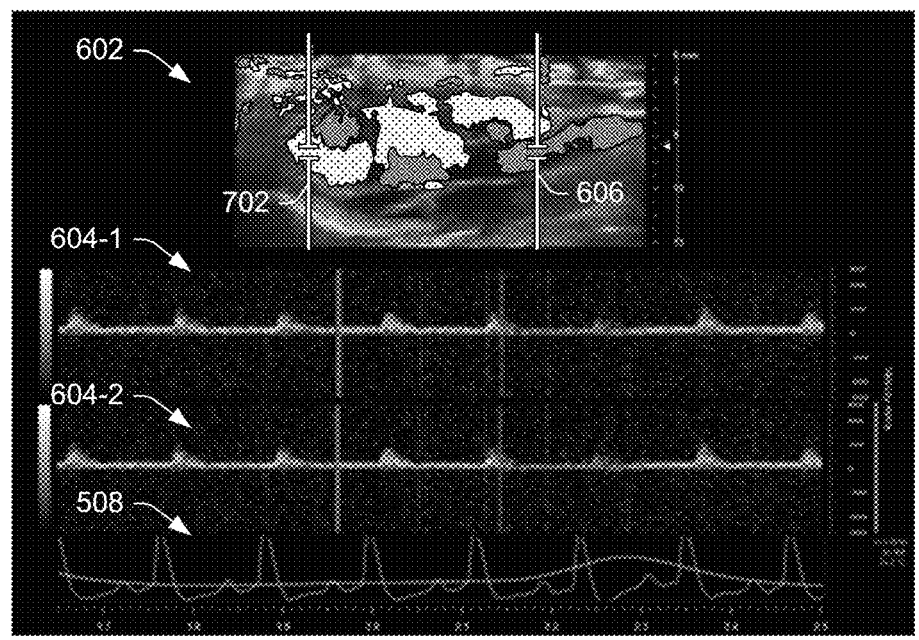
FIG. 7 illustrates an example implementation of a display of a color Doppler image along with a simultaneous display of multiple PW spectrums each corresponding to a different sample volume.

FIG. 7 illustrates an example implementation 700 of a display of a color Doppler image along with a simultaneous display of multiple PW spectrums each corresponding to a different sample volume. For example, the user may provide a first user input that selects a first virtual sample volume by selecting a first location on the color Doppler image 602. The on-screen marker (e.g., the crosshair 606) is displayed to indicate the selected location of the first virtual sample volume. Then, the user may provide a second user input that selects a second virtual sample volume by selecting a second location on the color Doppler image 602. A second on-screen marker (e.g., crosshair 702) is then displayed to indicate the selected location of the second virtual sample volume. Based on the user selections, the system accesses the EKV data to locate portions of the data corresponding to the first and second selected locations and processes the data at those points in a PW Doppler pipeline to provide a PW spectrum for each virtual sample volume. In the illustrated example, a first PW spectrum 604-1 corresponding to the first virtual sample volume represented by crosshair 606 is displayed simultaneously with a display of a second PW spectrum 604-2 corresponding to the second virtual sample volume represented by the crosshair 702. As illustrated, the first PW spectrum 604-1 and the second PW spectrum 604-2 can be displayed in horizontal alignment according to the physiological signal represented by the time scale 508.

This simultaneous display of multiple PW spectra can be useful for real-time computation of pulse-wave velocity, which is the speed at which the wave of blood as initiated by the heart travels through a vessel. For example, the pulse-wave velocity can be determined based on measuring an offset of when the wave arrives at a first point (e.g., represented by the crosshair 702) to when the wave arrives at a second point (e.g., represented by the crosshair 606). Signal processing techniques can be used to automatically compute the correct position in the PW spectrum for this implementation. In some aspects, the system can compute metrics from multiple PW spectra including, for example, a peak point relative to an R-wave. Such computation can be performed by the system for substantially all (including all) points through a vessel as defined by a line or trace.

Both of the PW spectra 604-1 and 604-2 are synchronized with the time scale 508 (e.g., ECG trace) to ensure that the PW spectra 604-1 and 604-2 are synchronized with each other. As above, the EKV data is acquired and stored in a memory to enable selective computation, retrospectively, of PW spectra corresponding to one or more user-selected virtual sample volumes from the displayed color Doppler image, without requiring an additional scan (e.g., PW Doppler scan) of the subject.

In some aspects, the virtual sample volumes can be automatically selected by the ultrasound system 100 based on one or more predefined settings stored in the memory 110 or one or more imaging parameters associated with a type of imaging being performed (e.g., small-vessel imaging, anatomy-structure imaging, fast-moving fluid imaging, etc.). For example, a predefined setting can indicate that pulse-wave velocity is a desired metric to be determined and can be set prior to acquisition of the ultrasound data. The ultrasound system 100 can, based on the predefined setting, automatically select multiple sample volumes in a detected vessel, such as sample volumes located in a center of the vessel. The multiple sample volumes can be evenly distributed along the center of the vessel. In an example for small-vessel imaging, an imaging parameter (e.g., gain, depth, PRF, etc.) can be defined to cause the ultrasound system 100 to provide the top 5 or 10 likeliest locations for small vessels and recommend (e.g., provide indications for) such locations. Such automation can be helpful where it is difficult for the user to distinguish the small vessels in the EKV image (e.g., the small vessels are not shown with color in the EKV image). In another example, based on a predefined setting, an average pulse-wave velocity can be automatically determined for one or more (including all) vessels detected in the EKV image. In another example, based on one or more imaging parameters, R-wave peak time can be automatically calculated for a plurality of sample volumes in one or more vessels detected in the EKV image.

Figure 8:
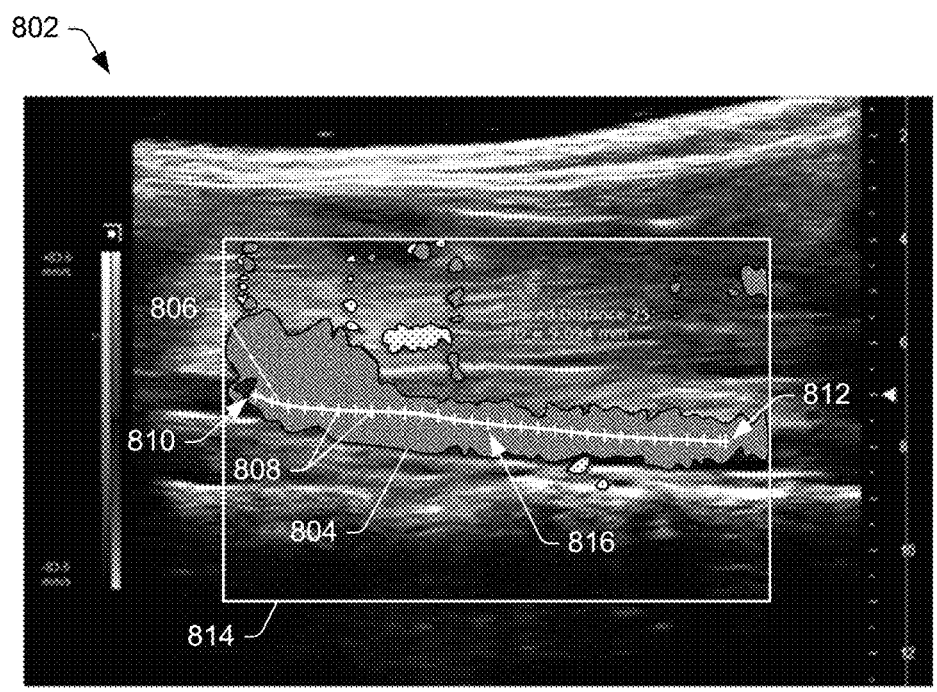
FIG. 8 illustrates an example implementation of a color Doppler image with multiple PW sample volumes as defined by a trace.

FIG. 8 illustrates an example implementation 800 of a color Doppler image 802 with multiple PW sample volumes as defined by a trace. The color Doppler image 802 is displayed with colored areas (represented in FIG. 8 by different dot-densities) that represent blood flow in different directions. For example, a dotted area 804 represents blood flow through a vessel.

Multiple analytics can be computed at each position along a trace (e.g., trace 806) and referenced to a position on the trace 806 (and on the color Doppler image 802). For example, positions 808 are shown along the trace 806 to indicate locations where PW Doppler analysis was performed on the EKV data acquired during the EKV scan. Accordingly, rather than computing two positions, as described with respect to FIG. 7, the example in FIG. 8 shows many positions calculated. Such computations and analysis can provide the pulse-wave velocity, not only at the ends of a vessel, but also at various positions 808 through the vessel. In one example, the positions 808 are provided automatically by the system, such as with a machine-learned model that processes the color Doppler image 802 and generates inferences including the positions 808.

In another example, the user provides input (e.g., mouse click, touch input, drag gesture, multiple separate selections, eye gaze, etc.) that creates the trace 806. The user input can draw the trace across the EKV image. The user input can select left and right sides 810 and 812, respectively, and the system can automatically create the trace to connect the two user selections. The automatically created trace can be centered in the vessel or centered in the area representing the blood flow. Alternatively, the automatically created trace can follow locations in the vessel where the pulse-wave velocity of the blood flow is substantially constant, which can provide the operator with an indication of the linearity (or non-linearity) of a pulse (e.g., heartbeat) traveling through the vessel. The indication of the linearity or non-linearity can be displayed, for example, as a number (e.g., a percentage, a polynomial order that fits the trace, etc.) In one example, the user input can define a region (e.g., box 814) of the color Doppler image 802 and the ultrasound system 100 can automatically perform calculations within the region. By defining the region, the user can reduce the amount of processing performed by the ultrasound system 100 because PW calculations are performed on the locations within the defined region but not performed on locations outside of the defined region. Additionally, or alternatively, the system can automatically determine the region, such as with a machine-learned model that processes the color Doppler image 802 and generates inferences including the box 814.

Using the techniques described herein, a single imaging acquisition (e.g., EKV imaging) can be performed on the subject and then, using the acquired data, various analytics can be computed (e.g., for PW analysis) without requiring additional imaging. Further, the system can provide multiple (e.g., dozens) sample volumes. In one example, the pulse-wave may not travel linearly through the vessel but using these techniques, the system can provide pulse-wave velocity calculations at multiple locations through the vessel. In another example, if the user sees something interesting in another area of the color Doppler image 802 (e.g., outside of the vessel), the user can select a corresponding location on the color Doppler image 802 to cause the system to compute a PW spectrum and/or metrics (e.g., blood velocity, direction, etc.) at the selected location. No additional imaging or scanning of the subject is required to acquire such data. In another example, the color Doppler image 802 may include color artifacts, which appear as interesting areas in the image. The user may select a location in that interesting area to place a sample volume there and cause the system to provide information such as a PW spectrum and/or metrics associated with the selected location. The provided information may be sufficient for the user to quickly determine that the interesting area is just a color artifact, or represents a problem in the anatomy.

As mentioned, the acquired data can be synchronized with a physiological signal, such as the ECG signal (e.g., R-wave of a heart signal). There is a time delay between acquiring data at a left side 810 of the image and acquiring data at a right side 812 of the image. For example, there may be a 2-second or 3-second time gap between the two areas. Further, because the subject is moving (e.g., breathing, blood is flowing), the data at different areas of the image (e.g., the left side 810, a middle 816, the right side 812) may not represent the same moment in time. Therefore, the ECG signal can be used as a gating metric or reference point to synchronize the data based on an assumption that the heart cycles are generally similar over time. Multiple heart cycles can be averaged to reduce variances and synchronize the EKV data. However, computing a PW spectrum from the raw EKV data (without averages) can provide highly accurate results, which are also synchronized to the ECG signal.

The total acquisition time of color EKV data increases significantly with both the amount of data acquired at each line and the PRF. To reduce the overall acquisition time, the time-per-line can be short (e.g., 0.5 seconds, 0.6 seconds, 0.75 seconds, etc.). Additionally, or alternatively, line density of the acquisition can be reduced. For instance, data can be acquired at every other line (half-line density) and still produce a reasonable color EKV image with sufficient resolution for detailed user-selection of a point for PW spectral analysis. The line density also can be non-uniform. In an example, acquisition of EKV data for 1-3 heart cycles of a mouse for each spectrum can take 100-400 ms. If the user-selected area (e.g., box 814) covers three-fourths of the color Doppler image 802 and the system is using half-line density, the number of lines requiring acquisition would be approximately 96, resulting in a total acquisition time of 10-40 seconds. For some applications (e.g., abdominal applications) where the maximum PRF is lower, the scan time may be further reduced by interleaving the ultrasound signals.

Some of the image acquisition settings, such as quadrature bandpass (QBP) filters, can be different between color EKV imaging and PW Doppler imaging. However, the QBP filter in PW Doppler imaging is usually matched to the gate size, so the color QBP filter can be used and the sample can be integrated to produce the PW spectrum. Other settings of the color EKV imaging are similar to settings for the PW Doppler imaging and can be used for producing the PW spectrum.

PW Doppler imaging can employ a larger number of transmit cycles than color EKV imaging. However, such a difference may be moderated by performing integrations over a number of samples. In such a mode, a transmit waveform with a larger number of transmit cycles can be used. It may be understood by the user that the PW spectra in this mode can include more noise than a single PW sample volume-only acquisition.

Example Methods

FIGS. 9-12 depict methods 900, 1000, 1100, and 1200, respectively for simultaneous acquisition of PW Doppler and color Doppler for retrospective analysis of cardiovascular function (e.g., cardiac functions, vascular functions, or both). The methods 900, 1000, 1100, and 1200 are shown as a set of blocks that specify operations performed but are not necessarily limited to the order or combinations shown for performing the operations by the respective blocks. Further, any of one or more of the operations can be repeated, combined, reorganized, or linked to provide a wide array of additional and/or alternate methods. In portions of the following discussion, reference can be made to the example system 100 of FIG. 1 or to entities or processes as detailed in FIGS. 2-8, reference to which is made for example only. The techniques are not limited to performance by one entity or multiple entities operating on one device.

Figure 9:
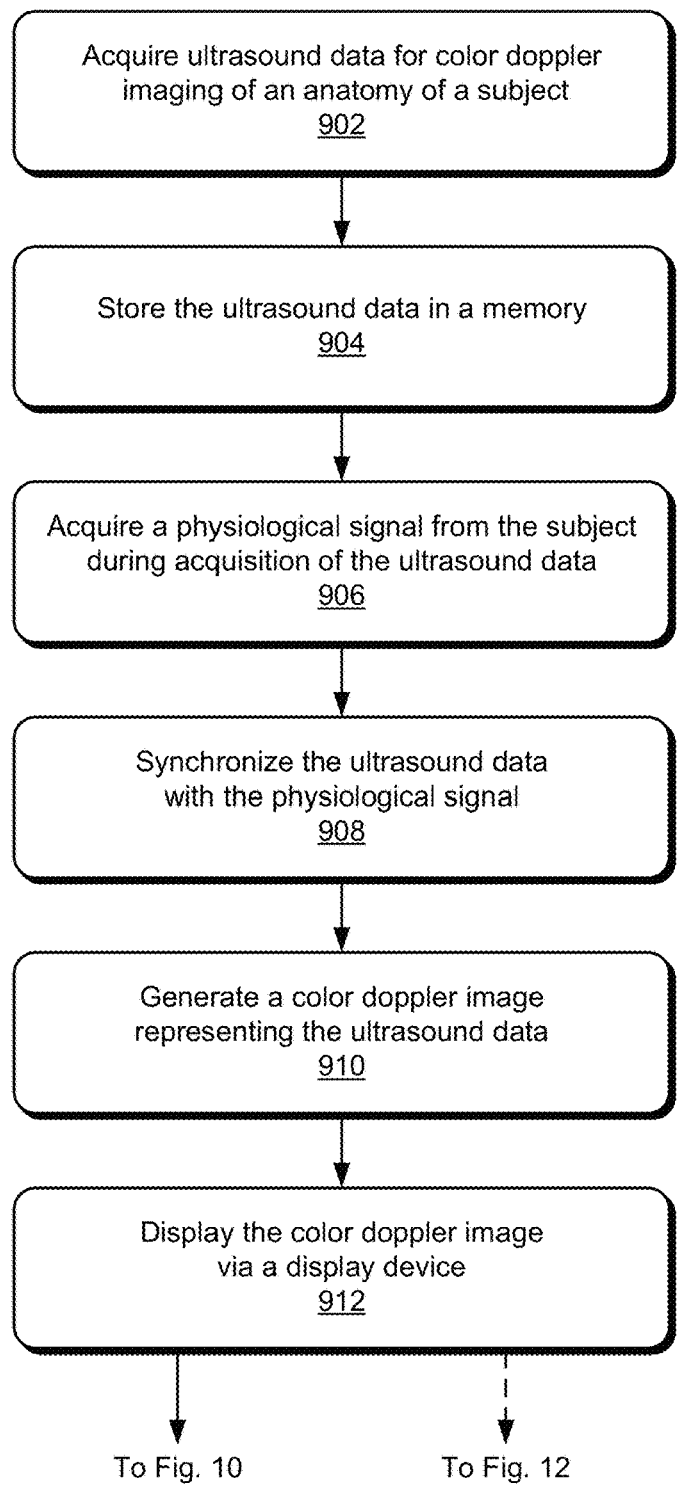
FIG. 9 depicts a method for simultaneous acquisition of PW Doppler and color Doppler data, in accordance with one or more implementations.
Figure 10:
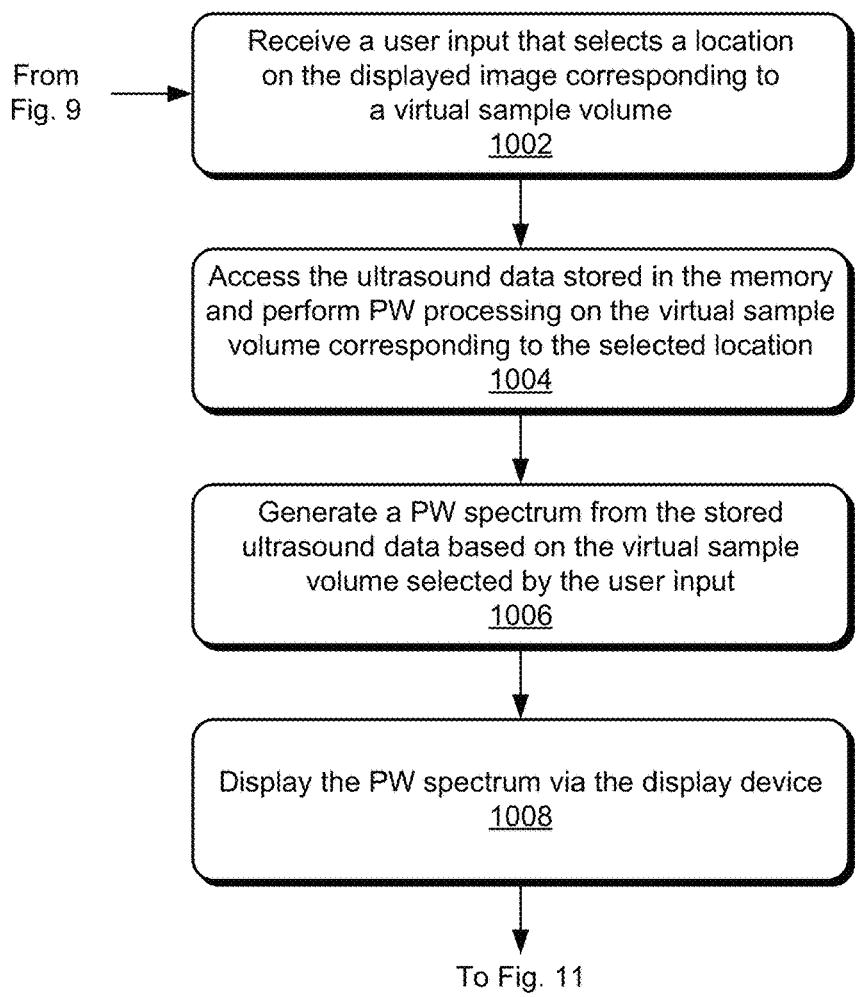
FIG. 10 continues from FIG. 9 and depicts a method for retrospective analysis of cardiovascular function based on the simultaneous acquisition of the PW Doppler and the color Doppler data.
Figure 11:
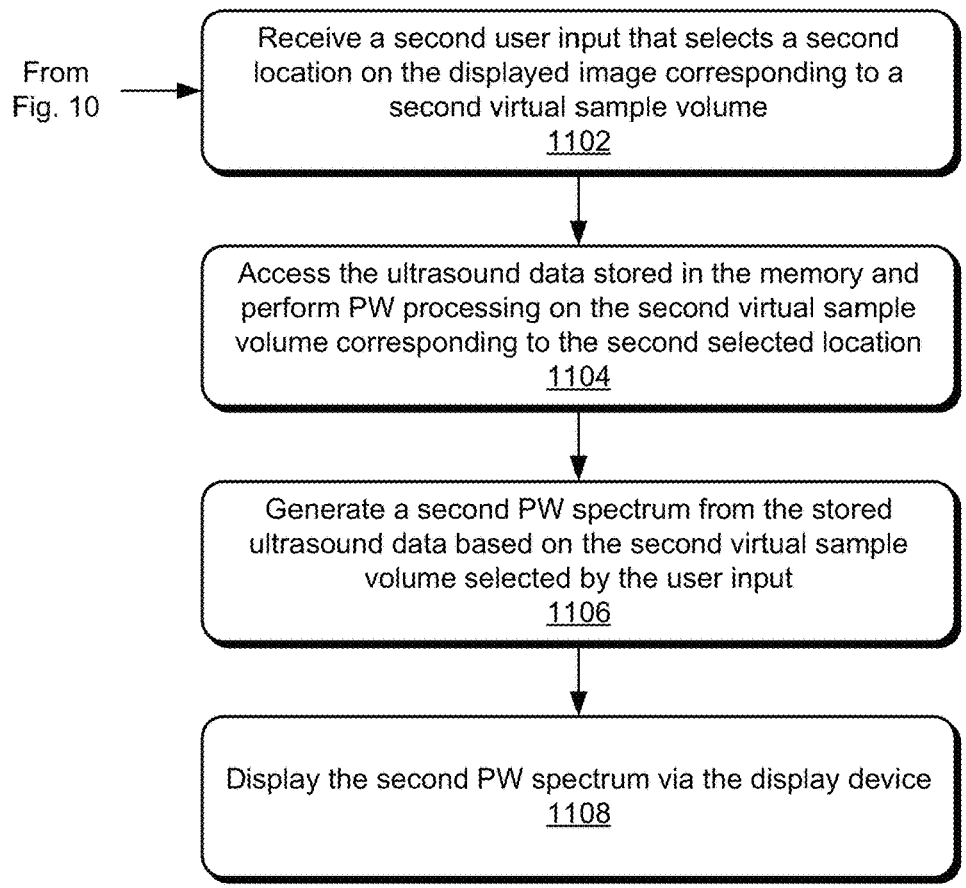
FIG. 11 continues from FIG. 10 and depicts a method for additional retrospective analysis of the cardiovascular function based on the simultaneous acquisition of the PW Doppler and the color Doppler data.
Figure 12:
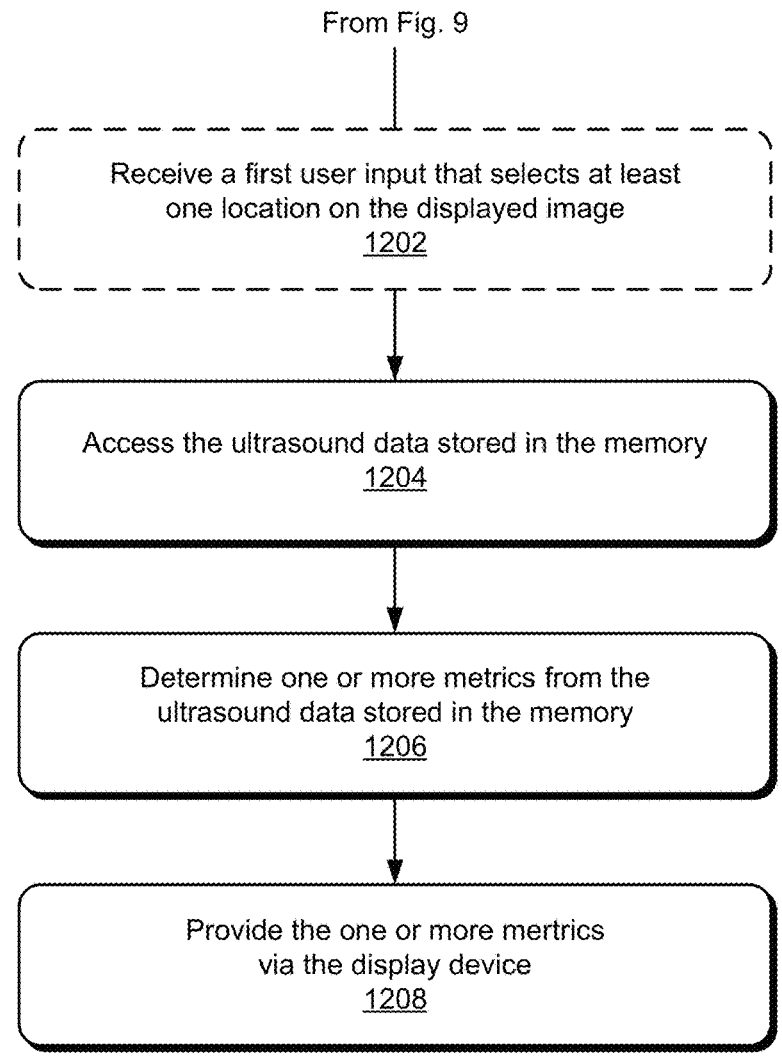
FIG. 12 continues from FIG. 9 and depicts a method for retrospective analysis of cardiovascular function, including automatic extraction of measurements, based on the simultaneous acquisition of the PW Doppler and the color Doppler data.

FIG. 9 depicts a method 900 for simultaneous acquisition of PW Doppler and color Doppler for retrospective analysis of cardiovascular function. FIG. 10 continues from FIG. 9 and depicts a method for retrospective analysis of cardiovascular function based on the simultaneous acquisition of the PW Doppler and the color Doppler. FIG. 11 continues from FIG. 10 and depicts a method for additional retrospective analysis of the cardiovascular function based on the simultaneous acquisition of the PW Doppler and the color Doppler. FIG. 12 continues from FIG. 9 and depicts a method for retrospective analysis of cardiovascular function, including automatic extraction of measurements, based on the simultaneous acquisition of the PW Doppler and the color Doppler. The methods 900, 1000, 1100, and 1200 can be performed by the ultrasound system 100, including the ultrasound machine 102.

At 902 in FIG. 9, ultrasound data for color Doppler imaging of an anatomy of a subject is acquired. For example, ultrasound data corresponding to echoes of ultrasound signals transmitted by an ultrasound scanner at the anatomy of the subject is acquired. The acquisition can be performed using color Doppler imaging techniques. For example, the acquisition can include repeatedly acquiring (e.g., transmitting ultrasound signals and receiving corresponding echoes), over a first period of time, ultrasound data for a first acquisition line used to generate a first line of image data prior to acquiring, for a second period of time, a second acquisition line used to generate a second line of image data. Accordingly, and due to using a high PRF, the acquisition of the ultrasound data can be performed according to one transmit pulse per acquisition line of an ultrasound image. In some applications, different angles can be used to acquire the ultrasound data and such data acquired using different angles can be compounded to improve the resulting ultrasound image.

At 904, the ultrasound data is stored in a memory. For example, the acquired ultrasound data is stored in its raw form in the memory 110 of the ultrasound system 100. Accordingly, the stored ultrasound data is EKV raw data (e.g., IQ data).

At 906, a physiological signal of the subject is acquired during acquisition of the ultrasound data. The physiological signal can be any suitable physiological signal of the subject, including a heart signal. For example, an ECG signal such as an R-wave is monitored while the ultrasound data is being acquired. Other signals could be temperature or signals from external systems, such as lasers, heating units, respirators, and pacemakers.

At 908, the ultrasound data can be synchronized with the physiological signal. For example, the ultrasound data is synchronized (e.g., time aligned) with the ECG signal to provide a time scale for processing the ultrasound data and generating an ultrasound image.

At 910, a color Doppler image representing the ultrasound data is generated. For example, the ultrasound system 100 generates a color Doppler image (e.g., image 602, image 802). The color Doppler image can include an ultrasound image with areas colored to represent blood flow in different directions.

At 912, the generated color Doppler image is displayed. For example, the color Doppler image (e.g., image 602, image 802) is displayed via the display device 108. In aspects, the color Doppler image is an ultrasound image with certain areas having visual indications (e.g., colored areas) representing blood flow and direction.

Continuing in FIG. 10 at 1002, a user input is received that selects a location on the displayed image to select a virtual sample volume. For example, the user provides input that selects a point or an area on the color Doppler image. The selected point corresponds to a virtual sample volume at that location (xy coordinate) of the color Doppler image.

At 1004, based on the user input, the stored ultrasound data in the memory is accessed and PW processing is performed on the virtual sample volume corresponding to the selected location. For example, the ultrasound system 100 accesses the ultrasound data stored in the memory 110 to locate and process a portion of the ultrasound data that corresponds to the virtual sample volume of the selected location. Because the raw EKV data is IQ data, the raw EKV data can be processed using PW Doppler imaging techniques, micro-vessel imaging techniques, or any other suitable imaging technique that uses IQ data. In one example, to reduce processing times, PW processing only processes the raw EKV data corresponding to the virtual sample volume selected by the user. Accordingly, the user selection causes the ultrasound system 100 to perform PW processing on the virtual sample volume(s). In another example, micro-vessel imaging processes the raw EKV data corresponding to a region of the color Doppler image that is associated with the selected location, such as a region including the selected point or selected area or a region matching the selected area.

At 1006, a PW spectrum is generated from the stored ultrasound data based on the virtual sample volume selected by the user input. For example, the ultrasound system 100 generates the PW spectrum 604 using ultrasound data that is stored in the memory 110 and that corresponds to the virtual sample volume (e.g., crosshair 606) representing a user-selected location on the color Doppler image 602.

At 1008, the PW spectrum is displayed. For example, the generated PW spectrum 604 is displayed via the display device 108. The PW spectrum can be displayed simultaneously with the color Doppler image. In some aspects, the ECG signal can also be displayed simultaneously with the PW spectrum and the color Doppler image in the same window or tab. In an example, each of the color Doppler image, the PW spectrum, and the ECG signal can be displayed in separate windows or tabs.

Continuing in FIG. 11 at 1102, a second user input is received that selects a second location on the displayed image to select a second virtual sample volume. In an example, the second user selection is represented by the crosshair 702 in FIG. 7, whereas the first user selection (selected at 912) is represented by the crosshair 606 in FIG. 7.

At 1104, based on the second user input, the ultrasound data stored in the memory is accessed and PW processing is performed on the second virtual sample volume corresponding to the second location of the second user selection. For example, the ultrasound system 100 accesses the ultrasound data stored in the memory 110 to locate and process a portion of the ultrasound data that corresponds to the second virtual sample volume of the second selected location. Accordingly, the second user selection causes the ultrasound system 100 to perform PW processing on the second virtual sample volume without requiring a new acquisition of ultrasound data specific for PW Doppler imaging.

At 1106, a second PW spectrum is generated from the stored ultrasound data based on the second virtual sample volume selected by the user input. For example, the ultrasound system 100 generates the PW spectrum 604-2 using ultrasound data that is stored in the memory 110 and that corresponds to the second virtual sample volume (e.g., crosshair 702) representing the second location on the color Doppler image 602 that was selected via the user input.

At 1108, the second PW spectrum is displayed. For example, the generated PW spectrum 604-2 is displayed via the display device 108. The second PW spectrum can be displayed simultaneously with the color Doppler image 602 and the first PW spectrum 604-1. In some aspects, the time scale 508 (e.g., ECG signal) is also displayed simultaneously with the color Doppler image 602 and both the first and second PW spectrums 604-1 and 604-2, respectively. The time scale 508, the color Doppler image 602, the first PW spectrum 604-1, and the second PW spectrum 604-2 can be displayed together via the same window or tab, or can be displayed in separate windows or tabs. When displayed together, the PW spectra can be displayed in horizontal alignment with one another and with the ECG signal to provide a visual correlation between the spectra and the ECG signal for the user. The ECG signal is synchronized (e.g., time aligned) with both the first and second PW spectra 604-1 and 604-2 to provide consistent information correlated to the same time scale.

Accordingly, the techniques described herein provide an ultrasound image, such as a color Doppler image, for display. For each location on the image that is selected by the user, the described techniques provide a PW spectrum and/or associated metrics for display for the user.

FIG. 12 depicts a method 1200 that optionally continues from method 900 in FIG. 9. The method 1200 is a method for automatic extraction of measurements from stored ultrasound data.

Optionally, at 1202, a first user input is received that selects at least one location on the displayed image. In one example, the user selects a location in an area of blood flow in a vessel, such as one of the positions 808, the left side 810, the right side 812, or any other suitable location in the displayed image. In another example, the user selects multiple locations in the displayed image, such as by selecting the left side 810 and providing a drag input (e.g., dragging a cursor with a mouse, drag gesture with a finger on a touchscreen, etc.) along the vessel to the right side 812 of the blood flow. The user input can draw the trace 806 or the ultrasound system 100 can automatically generate the trace between the start and end locations of the user input.

At 1204, the ultrasound data stored in the memory is accessed. As above, the ultrasound data is stored in its raw form (e.g., IQ) after being acquired using color EKV imaging techniques. In aspects, the acquired ultrasound data is stored in the memory 110.

At 1206, the ultrasound system determines (e.g., measures, extracts) one or more metrics from the ultrasound data stored in the memory. For example, the ultrasound system 100 can automatically generate the trace 806 and determine basic measurements in the corresponding area (e.g. the vessel), such as pulse-wave velocity at various locations or sample volumes along the trace 806, average pulse-wave velocity in the vessel, etc. Other metrics can include information associated with PW spectra at specific locations, such as time between intervals, rate of change of blood velocity, peak velocity, direction, etc. In some examples, the ultrasound system 100 can automatically detect and identify one or more objects (e.g., vessels) in the EKV image and determine boundaries or edges of the identified objects. Then, the ultrasound system 100 can automatically calculate metrics for the identified objects (e.g., without calculating metrics for all sample volumes in the EKV image).

In aspects, the ultrasound system 100 can determine one or more measurements of interest from the extracted metrics based on a value of a respective metric exceeding a threshold value. For example, each of the determined metrics can be compared to a respective threshold value. Metrics that exceed (above or below) their corresponding threshold value may indicate areas of concern for the subject. Multiple threshold values can be used to define different levels or ranges for the metric. In one example, the threshold value(s) for peak pulse-wave velocity may indicate high blood pressure or low blood pressure. If any of the metrics appear to be outside a "normal" range for the subject, then those metrics are determined to be measurements of interest of which to notify the user, such as by emphasizing (e.g., adjusting size, color, etc.) the measurements of interest on the display device.

At 1208, the one or more metrics are provided via the display device. In one example, the one or more metrics can be displayed simultaneously with the displayed image. In another example, the ultrasound system 100 provides indicators on the displayed image that represent one or more locations where sample volumes were used to extract measurements. The user can then interact with the ultrasound system 100 by selecting one of the indicators and in response, the ultrasound system 100 can provide more detailed information associated with the PW spectrum corresponding to the virtual sample volume at the selected location. In one example, a prompt is provided to the user to request whether to present data (e.g., more detailed information) associated with the one or more metrics. The user can then interact with the prompt to provide a user input that requests the more detailed information. The more detailed information can be provided in a report separate from the displayed image, such as via a separate window, tab, or overlay.

In one example, the ultrasound system 100 calculates a multitude of measurements from the stored ultrasound data to extract measurements from substantially all points or locations within the displayed image or within a region (e.g., box 402, box 814) of the displayed image. In another example, to further reduce the processing load, the ultrasound system 100 identifies vessels within the displayed image or within the region of the displayed image and then automatically calculates measurements for points or locations within the identified vessels. However, the user may select a location outside of the vessel and the ultrasound system 100 can, in response to the user selection, calculate measurements and generate a PW spectrum corresponding to a virtual sample volume associated with the selected location.

The techniques described herein are scalable to a plurality of data sets, such as ultrasound data acquired for multiple subjects. By storing the raw ultrasound data for many subjects, the system can automatically extract measurements from the ultrasound data of a plurality of subjects and generate and provide a summary of the measurements to a user. The user can then open one or more of the data sets to view them in more detail. Such an implementation can provide the user with useful comparative information that can lead the user to identify common issues between subjects.

Accordingly, the techniques described herein provide measurements for display that are extracted from ultrasound data acquired from one or more subjects and stored in memory, and in response to a user selection of a particular measurement for a particular subject, access the stored ultrasound data corresponding to the particular subject and provide a display of a PW spectrum of the time and position associated with the selected measurement.

The one or more measurements for display can include summary information corresponding to a number of identified vessels in the ultrasound data. The summary information can be displayed via a table, list, etc. In an example, the ultrasound system provides a table indicating 17 identified blood vessels with corresponding information (e.g., average pulse-wave velocity, direction, etc.). The user can interact with the table by selecting one of the blood vessels, such as blood vessel number 12. In response to the user selection, the ultrasound system can then (i) emphasize (e.g., highlight, outline, etc., crop the image to fit) the selected blood vessel and (ii) automatically select one or more sample volumes for the selected blood vessel. In some cases, the system can also display one or more PW spectra associated with the one or more sample volumes for the selected blood vessel.

CONCLUSION

Embodiments for simultaneous acquisition of pulsed-wave (PW) Doppler and color Doppler for retrospective analysis of cardiovascular function are disclosed and are advantageous, as they enable additional PW analysis after acquisition of color Doppler without requiring an additional PW Doppler acquisition. The imaging acquisition techniques disclosed herein provide solutions that enable retrospective analysis of acquired ultrasound data to provide additional measurements and information, either automatically or responsive to user interaction, without requiring additional acquisitions.

What is claimed is:
1. An ultrasound system comprising:
   an ultrasound scanner configured to generate ultrasound data for color Doppler imaging based on echoes of ultrasound signals transmitted by the ultrasound scanner into a subject at one or more anatomical targets of interest;
   one or more processors; and one or more computer-readable storage media having instructions stored thereon that, responsive to execution by the one or more processors, cause the one or more processors to:
synchronize the ultrasound data with a physiological signal acquired from the subject during acquisition of the echoes;
store the ultrasound data for color Doppler imaging in a memory;
generate a color Doppler image for display via a display device of the ultrasound system, the color Doppler image generated based on the ultrasound data generated by the ultrasound scanner;
automatically determine a pulse-wave velocity for a respective location of a plurality of locations along a vessel depicted in the color Doppler image;
provide a visual indicator via the display device indicating the respective location;
display a trace on the color Doppler image that connects the plurality of locations associated with the automatically determined pulse-wave velocities;
in response to a first user input that selects a first virtual sample volume corresponding to a first location on the color Doppler image, access the memory to locate a portion of the ultrasound data that corresponds to the first virtual sample volume;
generate a first pulsed-wave spectrum for the portion of the ultrasound data corresponding to the first virtual sample volume; and
determine one or more metrics associated with the first pulsed-wave spectrum for display via the display device.

2. The ultrasound system of claim 1, wherein the one or more processors are further configured to:
display the one or more metrics via a display device; and
provide a prompt to a user to request whether to present data associated with the one or more metrics.

3. The ultrasound system of claim 1, wherein the one or more processors are further configured to, in response to a second user input requesting additional information associated with the one or more metrics, display the pulsed-wave spectrum via the display device.

4. The ultrasound system of claim 3, wherein the pulsed-wave spectrum is displayed together with the color Doppler image via the display device.

5. The ultrasound system of claim 1, wherein the one or more processors are further configured to:
calculate an R-wave peak time for the first virtual sample volume based on the ultrasound data stored in the memory; and
determine a pulse-wave velocity corresponding to the first virtual sample volume.

6. The ultrasound system of claim 1, wherein the notification includes a display of the one or more measurements of interest being emphasized via the display device.

7. The ultrasound system of claim 6, wherein the threshold is one of multiple thresholds used to define different levels or ranges for the one or more metrics.

8. The ultrasound system of claim 6, wherein the one or more measurements of interest include particular metrics of the one or more metrics that are outside a normal range for the subject as defined by the threshold value.

9. The ultrasound system of claim 1, wherein the one or more metrics include at least one of a pulse-wave velocity at the first virtual sample volume, a time between intervals, a rate of change of blood velocity, a peak velocity, or a direction.

10. The ultrasound system of claim 1, wherein the one or more processors are configured to:
automatically identify one or more objects in the color Doppler image; and
automatically determine metrics for the one or more objects identified in the color Doppler image.

11. The ultrasound system of claim 10, wherein the memory is configured to store raw ultrasound data for a plurality of subjects, wherein the one or more processors are configured to:
automatically extract measurements from the raw ultrasound data for the plurality of subjects; and
generate a comparative summary of the extracted measurements of the plurality of subjects for display via the display device.

12. The ultrasound system of claim 11, wherein the one or more processors are configured to, in response to a user input that selects a measurement in the comparative summary for a particular subject of the plurality of subjects:
access a third portion the raw ultrasound data corresponding to the particular subject; and
provide a display of a pulsed-wave spectrum of a time and position associated with the user-selected measurement for the particular subject.

13. The ultrasound system of claim 11, wherein the comparative summary includes a number of identified vessels in the raw ultrasound data.

14. The ultrasound system of claim 1, wherein the one or more processors are configured to store the ultrasound data for the color Doppler imaging in the memory as uncompressed, demodulated, complex quadrature (IQ) data.

15. The ultrasound system of claim 14, wherein the first pulsed-wave spectrum and the color Doppler image are generated using the uncompressed, demodulated, IQ data.

16. The ultrasound system of claim 1, wherein the ultrasound scanner is configured for multiline acquisition of the echoes of the ultrasound signals.

17. The ultrasound system of claim 1, wherein the color Doppler image is generated with a frame rate of 100 or more frames per second.

18. An ultrasound system comprising:
an ultrasound scanner configured to generate ultrasound data for color Doppler imaging based on echoes of ultrasound signals transmitted by the ultrasound scanner into a subject at one or more anatomical targets of interest;
one or more processors; and
one or more computer-readable storage media having instructions stored thereon that, responsive to execution by the one or more processors, cause the one or more processors to:
synchronize the ultrasound data with a physiological signal acquired from the subject during acquisition of the echoes;
store the ultrasound data for color Doppler imaging in a memory;
generate a color Doppler image for display via a display device of the ultrasound system, the color Doppler image generated based on the ultrasound data generated by the ultrasound scanner;
in response to a first user input that selects a first virtual sample volume corresponding to a first location on the color Doppler image:
access the memory to locate a first portion of the ultrasound data that corresponds to the first virtual sample volume;

generate a first pulsed-wave spectrum for the first portion of the ultrasound data corresponding to the first virtual sample volume; and determine one or more metrics associated with the first pulsed-wave spectrum for display via the display device;

in response to receiving a second user input that selects a second virtual sample volume corresponding to a second location on the color Doppler image:

access the memory to locate a second portion of the ultrasound data that corresponds to the second virtual sample volume;

generate a second pulsed-wave spectrum of the second portion of the ultrasound data corresponding to the second virtual sample volume; and display the second pulsed-wave spectrum via the display device together with the color Doppler image and the first pulsed-wave spectrum;

select a plurality of sample volumes between the first location and the second location;

automatically determine, using the ultrasound data stored in the memory, a pulse-wave velocity for each of the plurality of sample volumes;

provide a visual indicator via the display device indicating a location of each of the plurality of sample volumes; and display a trace on the color Doppler image that connects the plurality of sample volumes associated with the automatically determined pulse-wave velocities.

19. The ultrasound system of claim 18, wherein the plurality of sample volumes are selected automatically based on one or more predefined settings stored in the memory or one or more imaging parameters associated with a type of imaging being performed.

20. The ultrasound system of claim 18, wherein the first pulsed-wave spectrum and the second pulsed-wave spectrum are displayed in horizontal alignment according to the physiological signal.

* * * * *